O. BOEHM.
BOTTLE OR RECEPTACLE.
APPLICATION FILED APR. 22, 1908. RENEWED MAY 28, 1912.
1,035,522.
Patented Aug. 13, 1912.
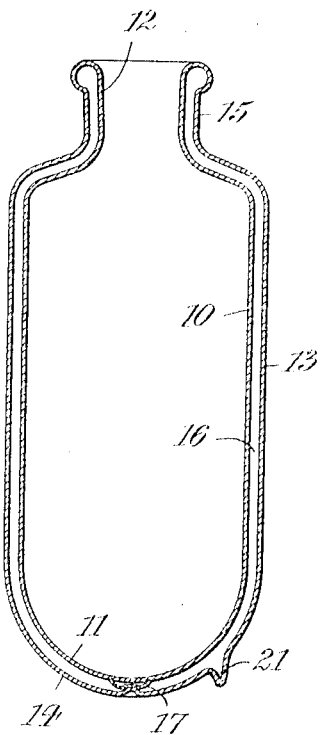
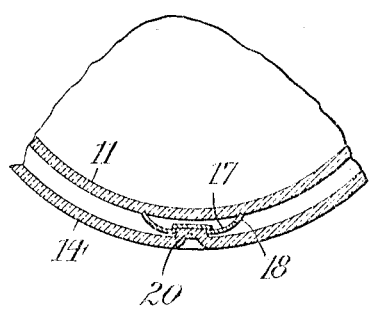
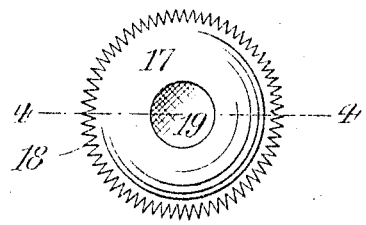
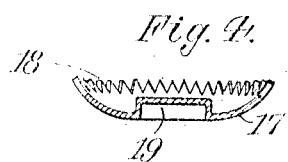
Witnesses:
W. R. Schulz.
August Miner.
Inventor:
Oscar Boehm
By his Attorney Arthur E. Gumpper

UNITED STATES PATENT OFFICE.

OSCAR BOEHM, OF NEW YORK, N. Y., ASSIGNOR TO ANDREW J. KELLEY, OF MOUNT VERNON, NEW YORK.

BOTTLE OR RECEPTACLE.

1,035,522.  Specification of Letters Patent.  Patented Aug. 13, 1912.

Application filed April 22, 1908, Serial No. 428,499. Renewed May 28, 1912. Serial No. 700,307.

*To all whom it may concern:*

Be it known that I, OSCAR BOEHM, a citizen of the United States, residing at New York city, Manhattan, county of New York, State of New York, have invented new and useful Improvements in Bottles or Receptacles, of which the following is a specification.

This invention relates to an improved bottle or receptacle for liquids, etc., which is so constructed that said liquids retain their temperatures for a considerable length of time. For this purpose the bottle is provided with double walls, between which a vacuum chamber is formed, and this invention relates, more particularly, to novel means for permanently sustaining the inner wall properly centered within the outer wall of the bottle. I have found that where such receptacles are used to contain exceedingly hot or cold liquids, it is necessary that the sustaining means be such as will permit of the expansion or contraction of the inner vessel which necessarily occurs. At the same time the inner vessel must be held against lateral movement; otherwise there is considerable liability of the receptacle cracking at the neck. It is also desirable that the sustaining means be of such character and located in such manner as to support the weight of the liquid contained in the inner vessel; in other words, the support should be so arranged as to cause the walls of both the inner and outer vessels to coöperate to this end.

By my present invention I obtain all of these valuable results, and in the accompanying drawing illustrating one form thereof Figure 1 is a vertical longitudinal section through my improved bottle; Fig. 2 an enlarged section through the bottom thereof; Fig. 3 a detail bottom view of the disk, and Fig. 4 a cross section on line 4—4, Fig. 3.

The numeral 10 indicates a cylindrical inner vessel provided with a curved bottom 11 and a contracted top or neck 12. Vessel 10 is inclosed within an outer vessel or casing 13, the shape of which corresponds, substantially, to that of vessel 10, vessel 13 being provided with a curved bottom 14 and a neck 15. Vessels 10 and 13 are preferably made of a heat insulating material such as glass, and they are molten or fused together at the neck, as shown in Fig. 1, the size of the vessels being such, that a comparatively narrow chamber 16 is formed between them.

In order to sustain vessel 10 properly spaced from vessel 13, and to avoid breakage of the inner vessel near its neck, I secure to the bottom of vessel 10, a dished disk 17 of metal or any other suitable material. Disk 17 is serrated at its periphery, as at 18, and is provided with a central recess 19. The latter is engaged by a projection or lug 20 extending inwardly from bottom 14 of vessel 13. Chamber 16 is evacuated, for which purpose vessel 13 is provided with a teat 21 which is sealed after the air has been exhausted from the chamber.

In manufacturing my improved bottle, the completed inner vessel 10 is heated at its bottom and disk 17 is pressed against said bottom in such a manner, that the circumferential teeth 18 of disk 17 bite slightly into the softened glass without, however, penetrating through the same. Vessel 10 is then inclosed within the outer vessel 13 and the necks of both vessels are fused together. Bottom 14 of outer vessel 13 is now heated and when the same has become sufficiently soft, the apex of bottom 14 is pressed inwardly by means of a suitable tool, so as to enter recess 19 of disk 17. Chamber 16 is then evacuated and teat 21 is sealed.

Although a cylindrical bottle is shown in the drawing, it is obvious that the bottle may have any suitable shape, without departing from the spirit of my invention. The shape of the support or disk 17 may also be varied, but as shown in the drawings it will engage both the inner and outer vessels so as to prevent any relative lateral displacement thereof, while at the same time the inherent elasticity or resiliency of the metal support will permit of the necessary expansion or contraction of the inner vessel when a hot or cold liquid is placed therein.

It will be seen that by the construction described, the inner vessel 10, of my improved bottle, is properly centered and yieldingly supported within casing 13 without exercising any undue strain upon the parts, so that breakage of the bottle is avoided, even if the filled bottle receives concussions or shocks. By this construction, the weight of the liquid contained in the inner vessel is also supported or sustained in part by the outer vessel, and thus the strength of the article is greatly increased.

It is obvious that many modifications and changes may be made in my invention without departing from the spirit thereof, and I do not intend to limit myself to the particular form shown and described, but

What I claim and desire to secure by Letters Patent is:—

1. A bottle of the character described, comprising an inner vessel having a curved bottom, an outer vessel having a curved bottom, and a sustaining, resilient metal disk interposed between said bottoms.

2. A bottle of the character described comprising an inner vessel having a curved bottom, a surrounding outer vessel having a curved bottom, a disk connected at its periphery to the bottom of the inner vessel, and means on the bottom of the outer vessel that engage the center of the disk.

3. A bottle of the character described comprising an inner vessel having a curved bottom, a surrounding outer vessel having a curved bottom, a recessed disk connected at its periphery to the bottom of the inner vessel, and a lug on the bottom of the outer vessel that engages the disk recess.

4. A bottle of the character described comprising an inner vessel, a recessed disk having a serrated periphery that engages corresponding indentations of said inner vessel, an outer vessel, and an inwardly-projecting lug on said outer vessel that engages the disk recess.

5. A bottle of the character described comprising an inner vessel having a curved bottom, a recessed disk having a serrated periphery that engages corresponding indentations of said bottom, an outer vessel having a curved bottom, and an inwardly-projecting lug on said last-named bottom that engages the disk recess.

6. A vacuum insulated bottle comprising an inner and outer part, a support mounted between the bases of said parts and means on the base of the inner part engaging said support to hold the same against displacement in any direction independently of the base of the outer part.

Signed by me at New York city, (Manhattan,) N. Y., this 18th day of April, 1908.

OSCAR BOEHM.

Witnesses:
OTTO RUEUSCH.
ARTHUR E. ZUMPE.

Copies of this patent may be obtained for five cents each, by addressing the "Commissioner of Patents, Washington, D. C."